United States Patent
Archer et al.

(10) Patent No.: US 8,752,229 B2
(45) Date of Patent: Jun. 17, 2014

(54) PIG LAUNCHER

(75) Inventors: Eirik Archer, Oslo (NO); Per Ragnar Dahl, Jar (NO); Ulf Lønnemo, Rasta (NO)

(73) Assignee: Kongsberg Oil and Gas Technologies AS, Asker (NO)

( * ) Notice: Subject to any disclaimer, the term of this patent is extended or adjusted under 35 U.S.C. 154(b) by 43 days.

(21) Appl. No.: 13/697,488

(22) PCT Filed: May 16, 2011

(86) PCT No.: PCT/NO2011/000153
§ 371 (c)(1),
(2), (4) Date: Dec. 4, 2012

(87) PCT Pub. No.: WO2011/145946
PCT Pub. Date: Nov. 24, 2011

(65) Prior Publication Data
US 2013/0111680 A1    May 9, 2013

(30) Foreign Application Priority Data
May 19, 2010    (NO) .................................... 20100731

(51) Int. Cl.
*F16L 55/46*    (2006.01)
(52) U.S. Cl.
USPC ....... 15/104.062; 15/3.5; 137/268; 405/184.1
(58) Field of Classification Search
CPC ...... F16L 55/46; F16L 2101/12; B08B 9/055; B08B 2209/055
USPC .................. 15/3.5, 104.062; 137/15.07, 268; 405/184.1
See application file for complete search history.

(56) References Cited

U.S. PATENT DOCUMENTS

| | | | |
|---|---|---|---|
| 2,790,500 A * | 4/1957 | Jones | 166/75.15 |
| 2,953,157 A * | 9/1960 | Osborne et al. | 137/268 |
| 3,175,240 A * | 3/1965 | Hillard | 15/104.062 |
| 3,266,076 A | 8/1966 | Surber | |
| 3,291,217 A * | 12/1966 | Wakefield, Jr. | 166/75.15 |
| 3,322,140 A * | 5/1967 | Scott | 137/268 |
| 3,961,493 A * | 6/1976 | Nolan et al. | 405/158 |
| 5,139,576 A | 8/1992 | Davis | |
| 5,219,244 A * | 6/1993 | Skeels | 405/158 |
| 6,022,421 A * | 2/2000 | Bath et al. | 134/8 |
| 6,428,241 B1 * | 8/2002 | Stracke et al. | 405/184.1 |
| 7,003,838 B2 | 2/2006 | Cunningham | |
| 2002/0053354 A1 | 5/2002 | McCanna et al. | |
| 2009/0083922 A1 | 4/2009 | Watson et al. | |

FOREIGN PATENT DOCUMENTS

| | | | |
|---|---|---|---|
| GB | 2368890 | * | 5/2002 |
| WO | WO 01/71238 | | 9/2001 |
| WO | WO 02/44601 | | 6/2002 |
| WO | WO 02/068856 | | 9/2002 |

* cited by examiner

*Primary Examiner* — Mark Spisich
(74) *Attorney, Agent, or Firm* — Gable Gotwals

(57) ABSTRACT

An apparatus (10) for launching one or more pigs (5) for cleaning of production flow lines, or tubing, on the sea bed is shown. The apparatus includes a lifting frame (1) retaining a charging pipe (3) which is able to carry a train of pigs ($5_1$-$5_{10}$) resting stand-by in the charging pipe (3), a plurality of valves ($V_1$-$V_4$) which on the one side is in fluid communication with the charging pipe (3), and on the other side is in fluid communication with a high pressure drive fluid different from the production flow, a connecting means (2) for connecting of the apparatus (10) to a closable pipe sub leading to the production flow line to be pigged, and an actuatable piston (4) which is able to displace the train of pigs within the charging pipe (3).

14 Claims, 5 Drawing Sheets

Figure 1A:
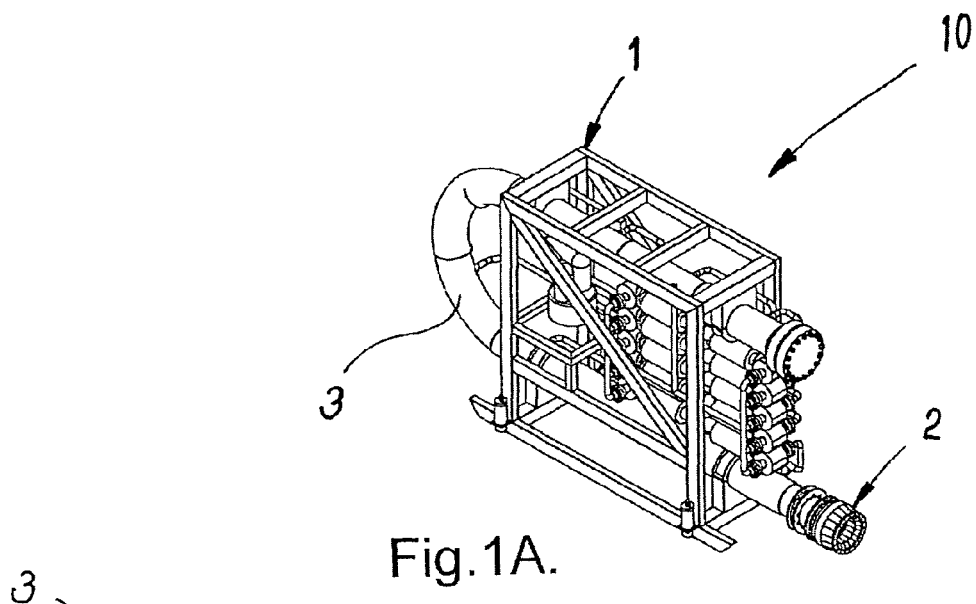

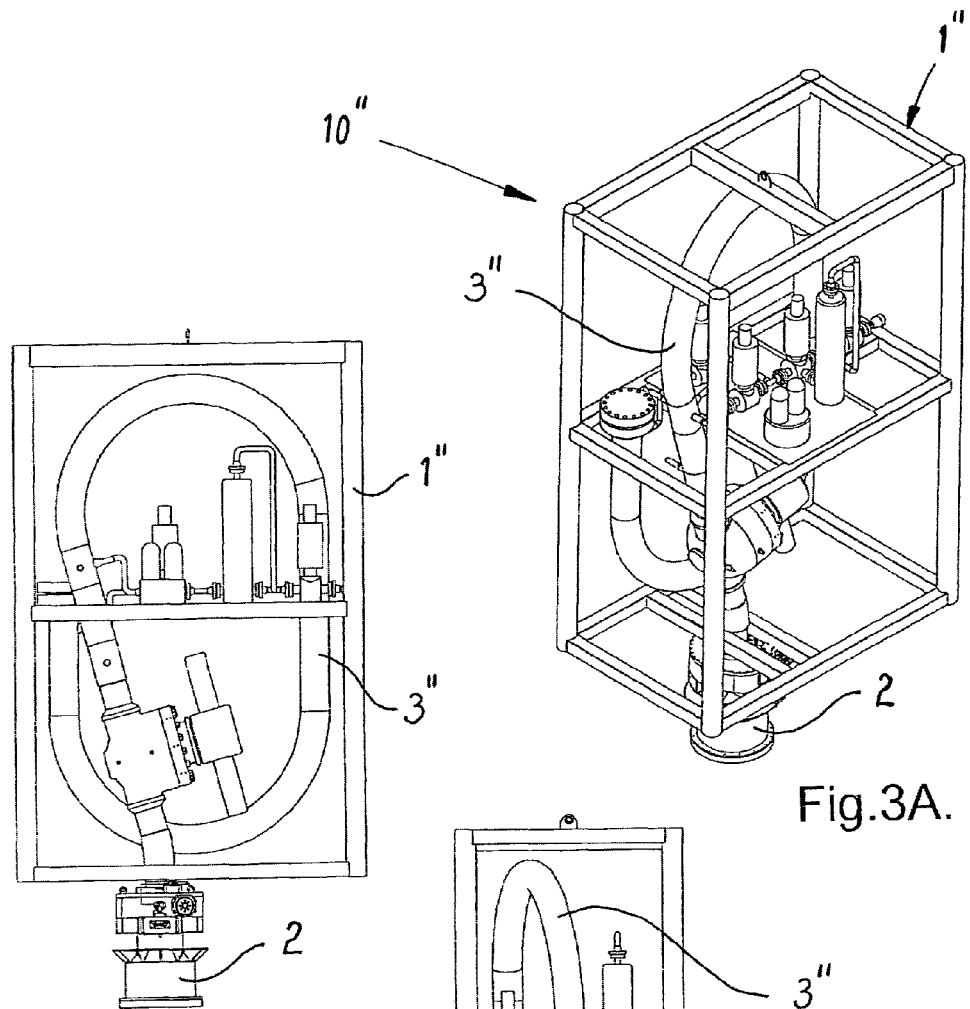
Fig.3A.
Fig.3B.
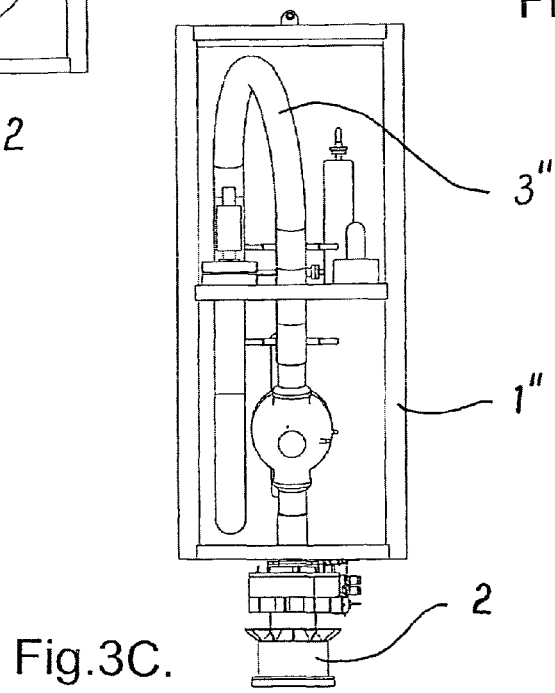
Fig.3C.

PIG LAUNCHER

CROSS-REFERENCE TO RELATED APPLICATIONS

This application is the United States National Phase of PCT Patent Application No. NO2011/000153 filed on 16 May 2011, which was published in English on 24 Nov. 2011 under Publication No. WO 2011/145946 A1, which claims priority to Norwegian Patent Application No. 2010 0731 filed 19 May 2010, both of which are incorporated herein by reference.

BACKGROUND OF THE INVENTION

The present invention relates to the technical field that involves internal cleaning of pipelines. Then we have pipelines deployed on the seabed transporting oil and/or gas in mind. Such pipelines are of substantial dimensions. One problem with such pipelines is that internal scaling or deposits are building up that eventually clogs the pipe if this is ongoing too long. Typical deposits are hydrates or wax, but may also include sand, gravel or other sediments. In order to clean pipelines for deposits, a pig is launched through the pipeline at regular intervals. The pig scrapes off the pipeline wall and pushes the deposits ahead of it. Such pigs have a configuration that has developed over time and exist in many variants and are considered as known per se in this connection. It is to be mentioned that such pigs often has one or more internal openings in order to be able to perform jetting ahead of the pig. The purpose of such jetting is to prevent accumulation of deposits in front of the pig which could cause its stop.

It has been common practice to deploy a separate loop from the production platform and all the way down to the subsea structure where the oil/gas is produced and switch subsea the pig into the production pipeline, or flowline, for return through the flowline up to the surface again.

More precisely, the present invention relates to an apparatus for launching one or more pigs for cleaning of production flow lines, or tubing, on the sea bed, including a support frame that supports a charging pipe, which is able to carry a train of pigs resting stand-by in the charging pipe, a plurality of valves, which on the one side are in fluid communication with the charging pipe, and on the other side are in fluid communication with a high pressure drive fluid different from the production flow, a connecting means for connecting of the apparatus to a normally closable pipe hub, leading to the production flow line to be pigged, and an actuatable piston which is able to displace the train of pigs within the charging pipe.

This solution is intended for placement on the seabed and to be connected to the subsea structure. It is to be mentioned, however, that with reasonable simplicity, the pig launcher can be retrieved to the surface again by use of a ROV, either for reloading of more pigs, or for use at a different location. Thus the pig launcher can be considered as kind of tool.

From US 2009/0083922 A1 it is known a pig and a device for automatic launching of a pig one by one into a pipeline to be cleaned. This publication is particularly concerned with a pig that has a central passage there through, which opening can be opened/closed by a valve.

Further examples of the prior art are known from WO 02/44601 A2; WO 01/71238; WO 02/068856 and U.S. Pat. No. 7,003,838 B2.

According to the present invention, an apparatus of the introductory said kind is provided, which is distinguished in that a drive pig is arranged between the piston and the closest adjacent pig, that the drive pig is in sealing contact with the internal wall of the charging pipe;

that the drive pig is remote controlled actuatable by operation of said valves that apply drive fluid in predetermined volume when they open for advancement of the train of pigs, and applies drive fluid during launching of the pig in front;

that during shifting functional activities the drive fluid can be communicated:

a) into the charging pipe in the area just behind the drive pig when positioned in its initial position,
 b) into the charging pipe in the area just behind the foremost pig, and
 c) into/out from the charging pipe at both sides of the actuatable piston.

In a preferable embodiment the actuatable piston is influenced by a spring abutting a plate extending laterally of the charging pipe. This makes the piston to be single acting, i.e. that the piston returns to its position of origin by means of a return spring.

The charging pipe may have stop means impeding the actuatable piston to pass the inlet for drive fluid into the charging pipe according to point c) above.

In one embodiment where the supplied actuating fluid is of particularly high pressure, the actuatable piston can include two lands of different diameter, where the lands define a volume therebetween, which volume is in communication with an accumulator or volume compensator.

The operable valves can be in the form of a master valve in the line from the source of high pressure fluid, a three-way valve with branch off and a valve to the charging pipe according to point a) above, and a branch off and a valve to the charging pipe according to point b) above, in addition to two branch offs to the charging pipe according to point c) above.

In a preferable and less space demanding embodiment, the charging pipe can be designed in a curved shape.

One example of such a curvature will be that the charging pipe has a U-form.

A different example is that the charging pipe is designed in a helical configuration. This variant is intended for vertical connection. This provides the advantage that a simpler connection is achieved since it is not necessary to move the device horizontally in order to make up the connection.

In these curve shaped embodiments, the curved charging pipe can preferably have somewhat enlarged diameter in the curved areas in order to limit the deformations in the sealings of the pip during long term storage within the curved areas.

Conveniently the drive fluid can be MEG (Methanol Ethyl Glycol), alternatively methanol or mineral oil, or per se any suitable drive fluid.

Further, the circuit for high pressure fluid to be applied to the charging pipe can include a relieving safety valve, a pressure gauge with transmitter and a pig detector.

Figure 1B:
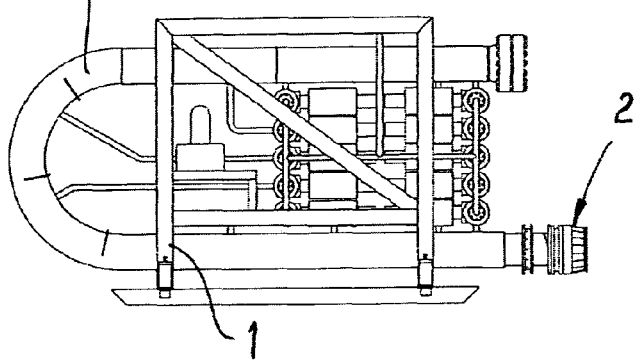
Figure 1C:
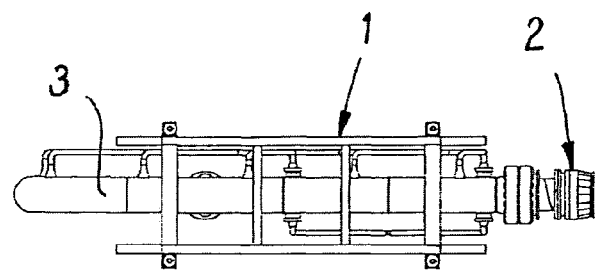
Figure 1D:
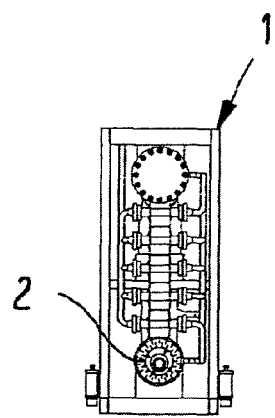
Figure 2A:
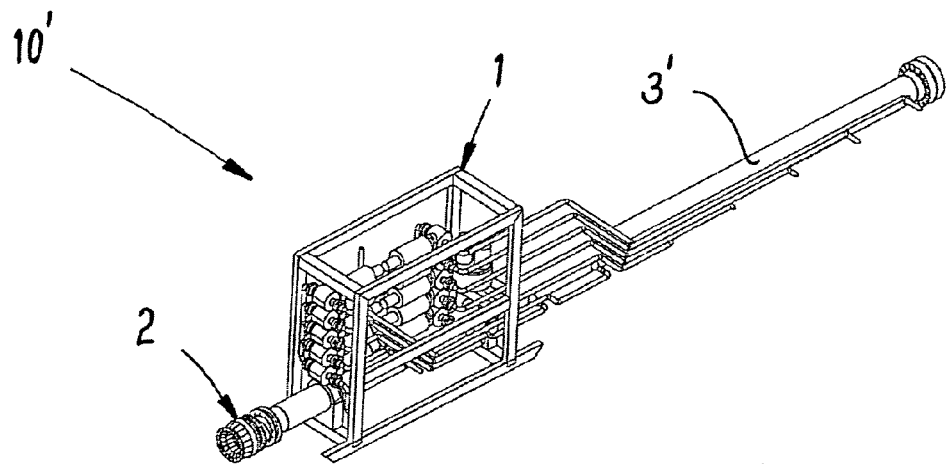
Figure 2B:
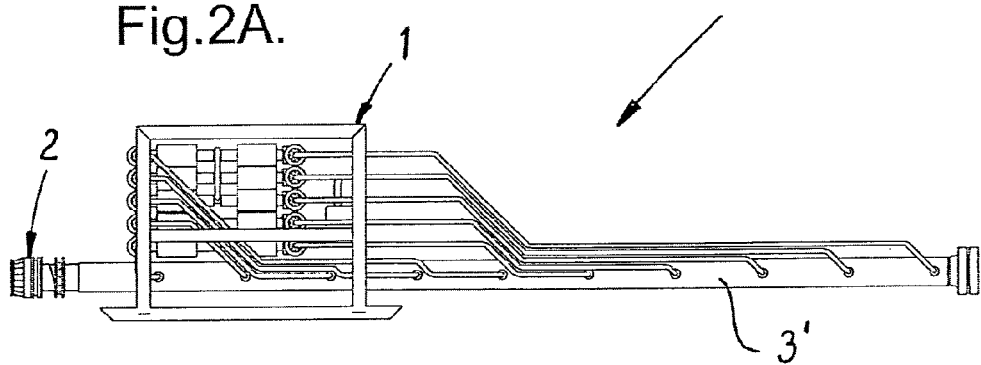
Figure 2C:
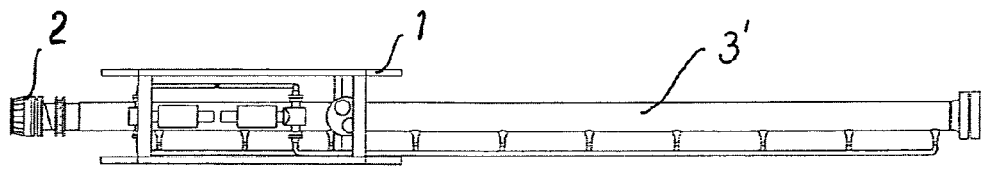
Figure 2D:
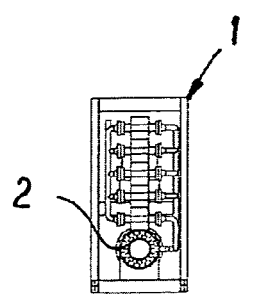
Figure 4:
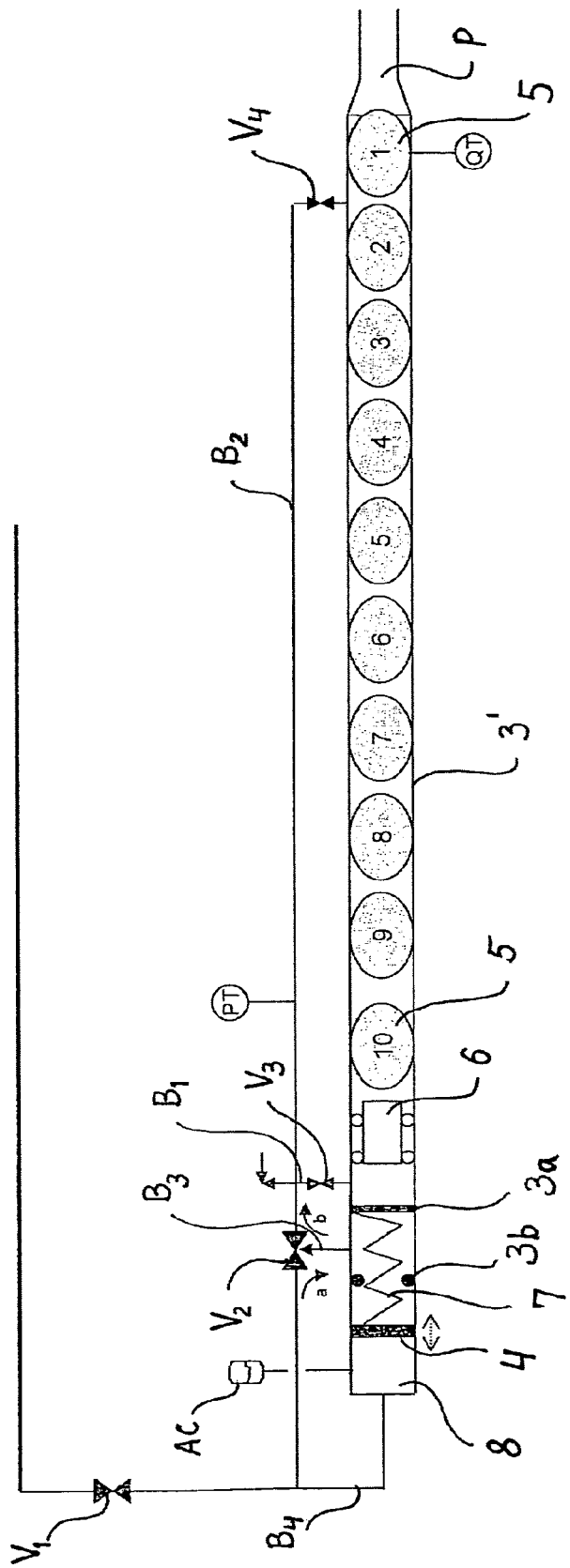
Figure 5:
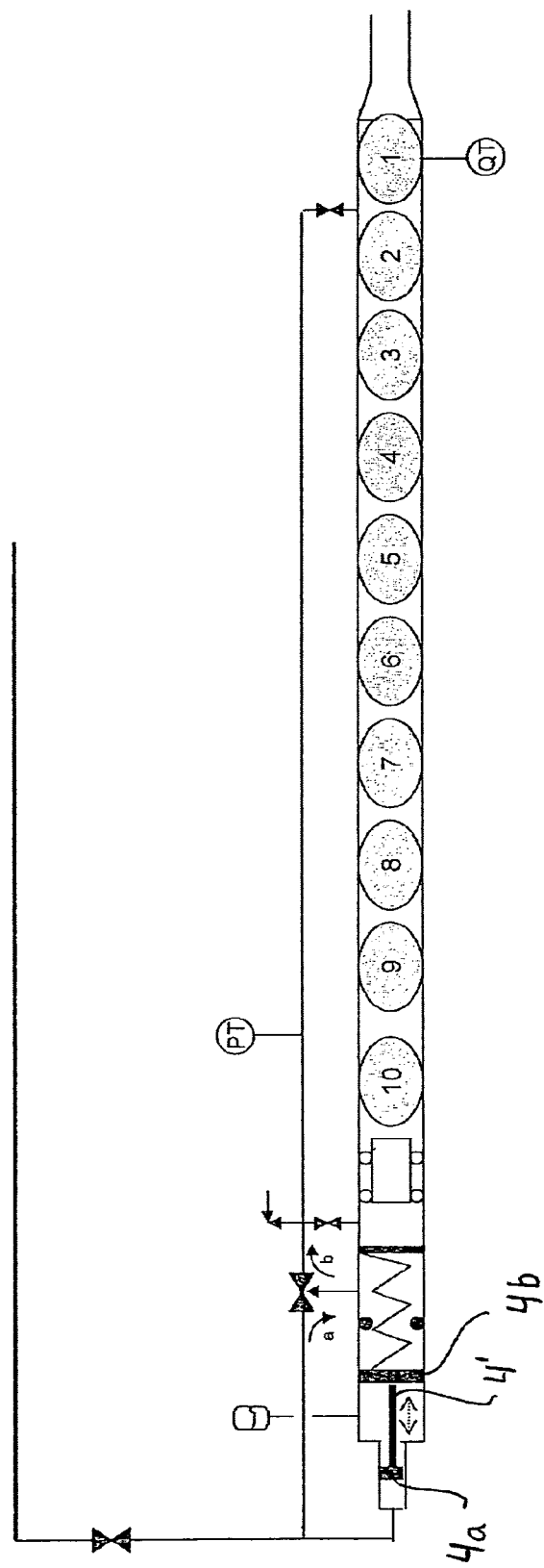

Other and further objects, features and advantages will appear from the following description of preferred embodiments of the invention, which are given for the purpose of description, and given in context with the appended drawings where:

FIG. 1A shows in perspective view an apparatus for launching a pig according to the invention, FIG. 1B shows an elevational view of the apparatus shown in FIG. 1A, FIG. 1C shows a top view of the apparatus shown in FIG. 1A, FIG. 1D shows an end view of the apparatus shown in FIG. 1A, FIG. 2A shows in perspective view a second embodiment of the apparatus for launching a pig according to the invention, FIG. 2B shows an elevational view of the apparatus shown in FIG. 2A, FIG. 2C shows a top view of the apparatus shown in FIG. 2A, FIG. 2D shows an end view of the apparatus shown in FIG. 2A, FIG. 3A shows in perspective view a third embodiment of the apparatus for launching a pig according to the invention, FIG. 3B shows an elevational view of the apparatus shown in FIG. 3A, FIG. 3C shows an end view of the apparatus shown in FIG. 3A, FIG. 4 shows a schematically sectioned view of an apparatus according to the invention in its simplest embodiment, and FIG. 5 shows a schematically sectioned view of a second embodiment of the apparatus according to the invention.

Firstly, with reference to FIG. 1A-1D, a complete apparatus 10 for launching a pipe pig (not shown in the drawing) is shown in different views. The apparatus 10 can be connected to a pipeline (not shown) deployed on the seabed by means of a connecting hub 2 and a connector (not shown). On command, when the apparatus 10 is connected to the pipeline and in operative state, the apparatus will be able to launch pigs one by one into the pipeline via remote control from the surface. Normally the apparatus 10 is connected to the pipeline adjacent to a subsea structure (not shown) carrying the end of the pipeline which also is in the form of a connecting hub.

The apparatus 10 includes a support frame 1 carrying a charging pipe 3, which in turn is charged with a plurality of pigs laying in a row after each other like a train. There they are resting in stand-by position until they are to be launched from the charging pipe 3 and transferred into a pipeline in order to perform a pigging operation. The end of the charging pipe 3 terminates in said connecting hub 2. When the pig has been transferred to the pipeline, the flow within the pipeline will carry the pig further on.

Moreover, the apparatus 10 includes a number of valves which on the one side is in fluid communication with the charging pipe 3, and on the other side in fluid communication with a high pressure drive fluid different from the production flow. The valves are described in closer detail together with FIGS. 4 and 5. As it appears from FIG. 1, the charging pipe 3 in this first embodiment is designed into a curved shape; more precisely the charging pipe 3 is designed into a U-formed configuration. Taking into account that the number of pigs can be so many as ten, and that each pig can be more than one meter long, there will be a significant desire to reduce the overall length of the apparatus 10 to reduce the space requirement, both during transportation and when it is installed on the seabed. It is also prepared and arranged for that the curved charging pipe 3 may have a somewhat enlarged diameter in the curved area in order to limit deformations in the seals of the pigs during long term storage (stand-by) within the curved area.

With reference to FIG. 2A-2D, a second embodiment of the apparatus 10' for launching of a pipe pig (not shown in the drawing) is shown in different views. Those main components that are different from the first embodiment have received a mark ' added to the reference number. As before, the apparatus 10' can be connected by means of a connecting hub 2 and a connector (not shown) to a pipeline (not shown) deployed on the seabed. On command, when the apparatus 10' is connected to the pipeline and in operative state, the apparatus will be able to launch pigs one by one into the pipeline via remote control from the surface, as in the above embodiment. The apparatus 10' is to be connected to the pipeline adjacent to a subsea structure (not shown) carrying the end of the pipeline, which also is in the form of a connecting hub. Otherwise, the apparatus has the same components as the embodiment according to FIGS. 1A-1D, but as it will appear from the figures, the charging pipe 3' itself is substantially rectilinear.

With reference to FIG. 3A-3C, a third embodiment of the apparatus 10" for launching of a pipe pig (not shown in the drawing) is shown in different views. Those main components that are different from the first embodiment have received a double mark " added to the reference number. As before, the apparatus 10" can be connected by means of a connecting hub 2 and a connector (not shown) to a pipeline (not shown) deployed on the seabed. On command, when the apparatus 10" is connected to the pipeline and in operative state, the apparatus will be able to launch pigs one by one into the pipeline via remote control from the surface, as in the above embodiment. The apparatus 10" is to be connected to the pipeline adjacent to a subsea structure (not shown) carrying the end of the pipeline, which is also in the form of a connecting hub. Note that the connection now normally takes place vertically, i.e. against a vertically extending connector hub. Otherwise, the apparatus has the same components as the embodiment according to FIGS. 1A-1D and 2A-2D, but as it will appear from the figures, the charging pipe 3" itself is designed in a helical configuration, and the support frame 1" is somewhat restructured.

Further description of the apparatus 10, i.e. the internals, takes place in conjunction with the FIGS. 4 and 5.

FIG. 4 shows a schematically sectioned view of an apparatus according to the invention in its simplest embodiment corresponding to that shown in FIG. 2A-2D, i.e. the rectilinear embodiment. The charging pipe 3' contains a train of pigs 5, numbered from 1 to 10 and called pig $5_1$ to $5_{10}$. At that end of the charging pipe 3' which is opposite to the connecting hub 2, a chamber 8 is arranged housing an actuatable piston 4 which can be actuated to have one pig 5 at the time to be displaced out from the charging pipe 3' and into the production flow pipeline. It is to be understood that the chamber 8 not necessarily needs to be an extension of the charging pipe 3', but can be a self-contained chamber, like that in FIG. 3.

Further, a drive pig 6 abutting the rearmost pig $5_{10}$ of the train, is arranged. The drive pig 6 is resting in a sealing way against the inner wall of the charging pipe 3'. The drive pig 6 can be activated to motion by remote control of valves that apply drive fluid in predetermined volume when they open. This contributes to the advancement of the train of pigs 5. The drive fluid will typically be MEG (Methanol Ethyl Glycol), pure methanol or mineral oil or other suitable drive fluid.

It is to be understood that the drive fluid during changing functional operations can be communicated:
  a) into the charging pipe in the area just behind the drive pig when located in its initial position,
  b) into the charging pipe in the area just behind the foremost pig, and
  c) into/out from both sides of the actuatable piston.

The actuatable piston 4 abuts a spring 7, which in the other end thereof, abuts a transversally extending plate 3a within the charging pipe 3'. The charging pipe 3' can include stopper means 3b that prevent the actuatable piston 4 to move further than one predetermined length and thus a predetermined displaced volume of liquid.

The operable valves are in the form of a master valve $V_1$ in the line from the high pressure fluid supply, one three-way valve $V_2$ having a branch off $B_1$, and a valve $V_3$ to the charging pipe 3' according to point a) above, and a branch off $B_2$ and a valve $V_4$ to the charging pipe 3' according to point b) above, and two branch offs $B_3$ and $B_4$ to the charging pipe 3' according to point c) above.

Normally, the circuit for high pressure fluid to be applied to the charging pipe 3' includes a relieving safety valve, a pressure gauge PT having a transmitter, an accumulator AC and a pig detector QT.

A launching sequence will now be described in connection with FIG. 4. The sequence starts with that the valve $V_1$ is opened. Then the valve $V_2$ is opened for through flow while the branch off $B_3$ is kept closed. Valve $V_3$ is kept closed and thus the branch off $B_1$. $V_4$ is kept open and thus flow can take place within the branch off $B_2$ which exits into the charging pipe 3' just behind the foremost pig $5_1$ and urges this one forward and through a pipe P having somewhat reduced diameter. When the launching of the foremost pig $5_1$ has taken place, this is detected by the pig detector QT and the valve $V_4$ gets closed.

What to take place now is that pig number 2, i.e. pig $5_2$, is to be advanced and take the place pig $5_1$ had and rest stand-by there until next pig is to be launched, perhaps in several months. For such advancement of a new pig, the drive plug 6 is used together with the actuatable piston 4. It is to be understood that the entire remainder train of pigs $5_2$ to $5_{10}$ needs to be pushed forward in one operation. The return spring 7 has initially urged the piston 4 to a start or initial position to the very left hand side in FIG. 4. The three-way valve $V_2$ is kept closed toward $B_4$, but is open for passage between $B_3$ and $B_1$ and further on to the drive plug 6 since the valve $V_3$ is opened. No flow takes place in $B_2$ since the valve $V_4$ is closed. When opening the master valve $V_1$, the high pressure fluid proceeds through $B_4$ to the chamber 8 having the piston 4 and urges the piston 4 to the right hand side in the figure and against the elastic force of the spring 7. The volume of liquid existing in the chamber 8 at right hand side of the piston 4 is expelled out and through the branch line $B_3$ via the three-way valve $V_2$ to the branch line $B_1$ and through the valve $V_3$ and into the charging pipe 3' behind the drive plug 6. Thus the drive plug 6 pushes the train of pigs 5 forward within the charging pipe 3' until pig $5_2$ encounters resistance at the restriction of the pipe diameter at the pipe P. This in combination with the metered volume expelled by the piston 4 corresponds approximately to the displacement of the pig or plug 6.

Then the valve $V_1$ can be closed and the three-way valve $V_2$ be opened such that the piston 4, by means of the elastic force of the spring 7, returns to its position of origin.

It is to be understood that the three-way valve $V_2$ can be replaced by single valves on the branch off line $B_3$ and one to the left of the drawn three-way valve in FIG. 4.

FIG. 5 shows a schematically sectioned view of a second embodiment of the apparatus according to the invention. As it appears from the figure, the actuatable piston 4' includes two lands 4a, 4b of different diameters, which landings 4a, 4b define a volume there between, which volume is in communication with an accumulator or volume compensator. This solution can be used if the pressurized fluid has very high applied pressure. Beyond this, the construction is similar to the one shown and described in connection with FIG. 4 and will not be described again.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. An apparatus (10) for launching one or more pigs (5) for cleaning of production flow lines, or tubing, on the sea bed, said apparatus comprising:
   a support frame (1) carrying a charging pipe (3) to carry a train of pigs ($5_1$-$5_{10}$) resting stand-by within the charging pipe (3);
   a plurality of valves ($V_1$-$V_4$), which on one side are in fluid communication with the charging pipe (3), and on the other side are in fluid communication with a high pressure drive fluid different from the production flow;
   a connecting means (2) for connecting of the apparatus (10) to a pipe hub, leading to the production flow line to be pigged;
   an actuatable piston (4) to displace the train of pigs within the charging pipe (3); and
   a drive pig (6) arranged between the piston (4) and a closest adjacent pig ($5_{10}$), wherein
   the drive pig (6) is in sealing contact with an internal wall of the charging pipe (3);
   the drive pig (6) is remote controlled actuatable by operation of said plurality of valves ($V_1$-$V_4$) that apply drive fluid in predetermined volume when the valves open for advancement of the train of pigs, and applies drive fluid during launching of the pig ($5_1$) in front; and
   during shifting functional activities the drive fluid can be communicated:
      a) into the charging pipe (3) in an area just behind the drive pig (6) when positioned in its initial position,
      b) into the charging pipe (3) in an area just behind a foremost pig (5), and
      c) into/out from the charging pipe (3) at both sides of the actuatable piston (4).

2. The apparatus according to claim 1, wherein the actuatable piston (4) is influenced by a spring (7) abutting a plate (3a) extending laterally of the charging pipe (3).

3. The apparatus according to claim 2, wherein the charging pipe (3) has stopper means (3b) impeding the actuatable piston (4) to pass an inlet for drive fluid into the charging pipe (3) according to point c) above.

4. The apparatus according to claim 1, wherein the actuatable piston (4) includes two lands of different diameter, where the lands define a volume there between, which volume is in communication with an accumulator or volume compensator.

5. The apparatus according to claim 1, wherein the operable valves are in the form of a master valve ($V_1$) in the line from the source of high pressure fluid, a three-way valve ($V_2$) with branch off ($B_1$) and a valve ($V_3$) to the charging pipe (3) according to point a) above, and a branch off ($B_2$) and a valve ($V_4$) to the charging pipe (3) according to point b) above, in addition to two branch offs ($B_3$) and ($B_4$) to the charging pipe (3) according to point c) above.

6. The apparatus according to claim 1, wherein the charging pipe is designed in a curved shape to reduce a requirement to space.

7. The apparatus according to claim 6, wherein the charging pipe is designed in a U-form.

8. The apparatus according to claim 7 wherein the curved charging pipe has a somewhat enlarged diameter in the curved areas in order to limit deformations in sealings of the pigs (5) during long term storage within the curved areas.

9. The apparatus according to claim 6, wherein the charging pipe (3") is designed in a helical configuration.

10. The apparatus according to claim 9 wherein the curved charging pipe has a somewhat enlarged diameter in the curved areas in order to limit deformations in sealings of the pigs (5) during long term storage within the curved areas.

11. The apparatus according to claim 6, wherein the curved charging pipe has a somewhat enlarged diameter in the curved areas in order to limit deformations in sealings of the pigs (5) during long term storage within the curved areas.

12. The apparatus according to claim 1, wherein the drive fluid is selected from the group consisting of: methanol ethyl glycol), pure methanol or mineral oil.

13. The apparatus according to claim 1, wherein a circuit for high pressure fluid to be applied to the charging pipe includes a relieving safety valve, a pressure gauge with transmitter and a pig detector.

14. The apparatus according to claim 1, wherein a chamber (8) is an independent chamber separate from the charging pipe (3').

\* \* \* \* \*